(12) United States Patent
Tam et al.

(10) Patent No.: US 8,906,485 B2
(45) Date of Patent: Dec. 9, 2014

(54) HIGH STRENGTH ULTRA-HIGH MOLECULAR WEIGHT POLYETHYLENE TAPE ARTICLES

(71) Applicant: Honeywell International Inc., Morristown, NJ (US)

(72) Inventors: Thomas Tam, Chesterfield, VA (US); Ashok Bhatnagar, Richmond, VA (US); Mark Benjamin Boone, Mechanicsville, VA (US); Steven Correale, Chester, VA (US)

(73) Assignee: Honeywell International, Morristown, NJ (US)

( * ) Notice: Subject to any disclaimer, the term of this patent is extended or adjusted under 35 U.S.C. 154(b) by 0 days.

(21) Appl. No.: 14/209,401

(22) Filed: Mar. 13, 2014

(65) Prior Publication Data

US 2014/0190343 A1    Jul. 10, 2014

Related U.S. Application Data

(62) Division of application No. 13/494,641, filed on Jun. 12, 2012, now Pat. No. 8,685,519, which is a division of application No. 12/539,185, filed on Aug. 11, 2009, now Pat. No. 8,236,119.

(51) Int. Cl.

| | |
|---|---|
| *C08F 110/02* | (2006.01) |
| *D04B 1/16* | (2006.01) |
| *F41H 1/02* | (2006.01) |
| *B32B 5/12* | (2006.01) |
| *B29C 55/06* | (2006.01) |
| *B29C 43/22* | (2006.01) |
| *D03D 13/00* | (2006.01) |
| *D03D 1/00* | (2006.01) |
| *B29K 23/00* | (2006.01) |

(52) U.S. Cl.
CPC ............... *C08F 110/02* (2013.01); *B32B 5/12* (2013.01); *B29K 2023/0683* (2013.01); *B29C 55/06* (2013.01); *B29C 55/065* (2013.01); *D04B 1/16* (2013.01); *B29C 43/22* (2013.01); *F41H 1/02* (2013.01); *D03D 13/004* (2013.01); *D03D 1/0052* (2013.01); *D03D 1/0035* (2013.01)
USPC .......... 428/105; 139/383 R; 428/98; 428/156; 428/213; 428/364; 442/135

(58) Field of Classification Search
CPC .... B29K 2223/0683; B32B 5/00; B32B 5/02; B32B 5/022; B32B 5/024; B32B 5/026; F41H 5/0471; F41H 5/0485
USPC ........ 428/98, 105, 156, 213, 364; 139/383 R; 442/135
See application file for complete search history.

(56) References Cited

U.S. PATENT DOCUMENTS

| | | |
|---|---|---|
| 4,413,110 A | 11/1983 | Kavesh et al. |
| 4,623,574 A | 11/1986 | Harpell et al. |

(Continued)

FOREIGN PATENT DOCUMENTS

| | | |
|---|---|---|
| EP | 0483780 A2 | 5/1992 |
| EP | 1627719 | 2/2006 |

(Continued)

OTHER PUBLICATIONS

Richard S. Stein, "The X~Ray Diffraction, Birefringence, and Infrared Dichroism of Stretched Polyethylene. II. Generalized Uniaxial Crystal Orientation," Journal o Polymer Science, vol. XXXI, pp. 327-334, 1958.

(Continued)

*Primary Examiner* — Brent O'Hern

(57) ABSTRACT

Processes for the production of high strength polyethylene tape articles from high strength ultra-high molecular weight multi-filament yarns, and to the tape articles, fabrics, laminates and impact resistant materials made therefrom.

4 Claims, 7 Drawing Sheets

(56) References Cited

U.S. PATENT DOCUMENTS

| | | | |
|---|---|---|---|
| 4,748,064 | A | 5/1988 | Harpell et al. |
| 4,819,458 | A | 4/1989 | Kavesh et al. |
| 4,996,011 | A | 2/1991 | Sano et al. |
| 5,091,133 | A | 2/1992 | Kobayashi et al. |
| 5,106,555 | A | 4/1992 | Kobayashi et al. |
| 5,200,129 | A | 4/1993 | Kobayashi et al. |
| 5,540,990 | A | 7/1996 | Cook |
| 5,578,373 | A | 11/1996 | Kobayashi et al. |
| 5,579,628 | A | 12/1996 | Dunbar et al. |
| 5,628,946 | A | 5/1997 | Ward et al. |
| 5,749,214 | A | 5/1998 | Cook |
| 6,017,834 | A | 1/2000 | Ward et al. |
| 6,148,597 | A | 11/2000 | Cook |
| 6,328,923 | B1 | 12/2001 | Jones et al. |
| 6,458,727 | B1 | 10/2002 | Jones et al. |
| 6,743,388 | B2 | 6/2004 | Sridharan et al. |
| 6,951,685 | B1 | 10/2005 | Weedon et al. |
| 7,279,441 | B2 | 10/2007 | Jones et al. |
| 7,311,963 | B2 | 12/2007 | Mokveld et al. |
| 7,407,900 | B2 | 8/2008 | Cunningham |
| 7,470,459 | B1 | 12/2008 | Weedon et al. |
| 8,685,519 | B2 * | 4/2014 | Tam et al. ............ 428/98 |
| 2002/0037391 | A1 | 3/2002 | Harpell et al. |
| 2008/0064280 | A1 | 3/2008 | Bhatnagar et al. |
| 2008/0251960 | A1 | 10/2008 | Harding et al. |
| 2008/0318016 | A1 | 12/2008 | Weedon et al. |
| 2009/0117805 | A1 | 5/2009 | Simmelink et al. |
| 2009/0181211 | A1 | 7/2009 | Lang et al. |
| 2010/0003452 | A1 | 1/2010 | Jongedijk et al. |

FOREIGN PATENT DOCUMENTS

| | | |
|---|---|---|
| GB | 2164897 | 4/1986 |
| JP | 60-097835 | 5/1985 |
| JP | 60-141537 | 7/1985 |
| JP | 05-214657 | 8/1993 |
| JP | 2008526406 | 7/2008 |
| WO | 2006074823 | 7/2006 |
| WO | 2007/107359 A1 | 9/2007 |
| WO | 2009/056286 A1 | 5/2009 |

OTHER PUBLICATIONS

Akira Kaito et al., "Hot Rolling and Quench Rolling of Ultrahigh Molecular Weight Polyethylene," Journal of Applied Polymer Science, vol. 28, pp. 1207-1220, 1983.

Akira Kaito et al., "Preparation of High Modulus Polyethylene Sheet by the Roller-Drawing Method," Journal of Applied Polymer Science, vol. 30, pp. 1241-1255, 1985.

Akira Kaito et al., "Roller Drawing of Ultrahigh Molecular Weight Polyethylene," Journal of Applied Polymer Science, vol. 30, pp. 4591-4608, 1985.

Li-Hui Wang et al., "New approach for processing ultrahigh-molecular weight polyethylene powder. Solid-state rolling followed by hot stretch (roll-draw)," Journal of Polymer Science, Part B: Polymer Physics, vol. 28, No. 12, pp. 2441-2444, Nov. 1990 (Abstract only).

R.J. Yan et al., "The hot compaction of SPECTRA gel-spun polyethylene fibre," Journal of Materials Science, vol. 32, pp. 4821-4831, 1997.

S.T. Correale et al., "Secondary Crystallization and Premelting Endo- and Exotherms in Oriented Polymers," Journal of Applied Polymer Science, vol. 101, pp. 447-454, 2006.

Eunji Lee et al., "Rigid-flexible block molecules based on a laterally extended aromatic segment: Hierarchical assembly into single fibers, flat ribbons, and twisted ribbons," Chemistry—A European Journal, vol. 14, No. 23, pp. 6957-6966, Aug. 8, 2008.

* cited by examiner

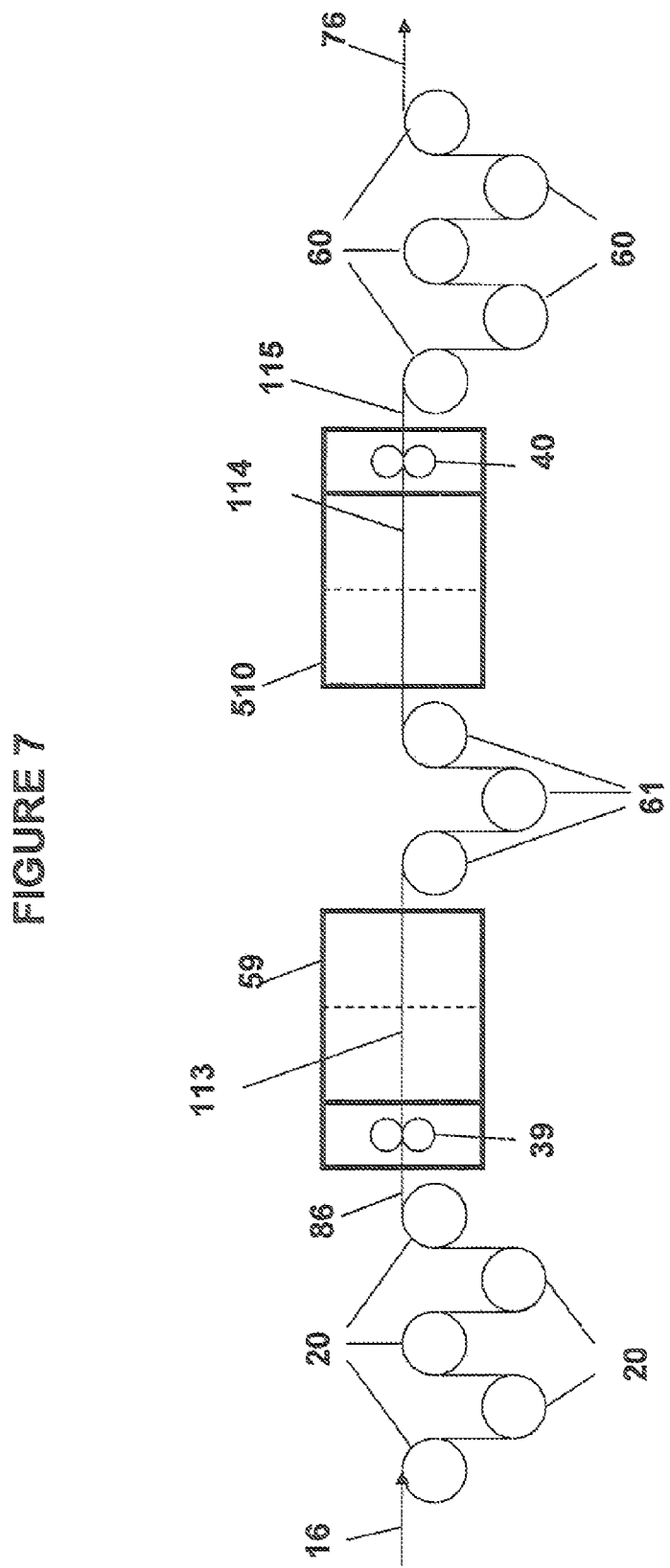

HIGH STRENGTH ULTRA-HIGH MOLECULAR WEIGHT POLYETHYLENE TAPE ARTICLES

CROSS-REFERENCE TO RELATED APPLICATION

This application is a Division of co-pending U.S. application Ser. No. 13/494,641, filed Jun. 12, 2012, now U.S. Pat. No. 8,685,519, which is a Division of U.S. application Ser. No. 12/539,185, filed on Aug. 11, 2009, now U.S. Pat. No. 8,236,119.

BACKGROUND OF THE INVENTION

1. Field of the Invention

The invention relates to processes for the production of high strength polyethylene tape articles from high strength ultra-high molecular weight multi-filament yarns, and to the tape articles, fabrics, laminates and impact resistant materials made therefrom.

2. Description of the Related Art

Impact resistant and penetration resistant materials find uses in many applications such as sports equipment, safety garments, and most critically, in personal body armor. The construction of body armor for personal protection is an ancient but not archaic art. Metal armor, already well known to the Egyptians by 1500 B.C., persisted in use until about the end of the $17^{th}$ century. In the current era, body armor has again become practical through the discovery of new strong fibers such as aramids, ultra-high molecular weight polyethylene (UHMW PE), and polybenzazoles.

Various fiber-reinforced constructions are known for use in impact-resistant, ballistic-resistant and penetration-resistant articles such as helmets, panels, and vests. These articles display varying degrees of resistance to penetration by impact from projectiles or knives, and have varying degrees of effectiveness per unit of weight. A measure of the ballistic-resistance efficiency is the energy removed from a projectile per unit of the target's areal density. This is known as the Specific Energy Absorption, abbreviated as "SEA", and having units of Joules per $Kg/m^2$ or $J$-$m^2/Kg$.

The SEA of a fibrous construction is known to generally increase with increasing strength, tensile modulus and energy-to-break of the constituent fibers. However, other factors, such as the shape of the fibrous reinforcement, may come into play. U.S. Pat. No. 4,623,574, presents a comparison between the ballistic effectiveness of a composite constructed with a ribbon-shaped reinforcement versus one using a multi-filament yarn: both of UHMW PE. The fiber had a higher tenacity than the ribbon: 30 grams/denier (abbreviated g/d) versus 23.6 g/d. Nevertheless, the SEA of the composite constructed with the ribbon was somewhat higher than the SEA of the composite constructed with the yarn. U.S. Pat. No. 4,623,574 teaches that elastomer coated strip or ribbon can be more effective than coated-filament yarn in producing ballistic resistant composites.

The preparation of UHMW PE articles having flat cross-sections by a process commonly known as "gel spinning" is described in U.S. Pat. No. 4,413,110. A ribbon prepared by the method of U.S. Pat. No. 4,413,110 is described in U.S. Pat. No. 4,623,574. It had a width of 0.64 cm, a denier of 1240, and a tenacity of 23.9 g/d (corresponding to a tensile strength of 2.04 GPa).

Other processes for the preparation of UHMW PE tape articles are described in U.S. Pat. Nos. 4,996,011; 5,002,714; 5,091,133; 5,106,555; 5,200,129; 5,578,373; 5,628,946; 6,017,834; 6,328,923 B1; 6,458,727B1; 7,279,441 B2; 6,951,685 B1; U.S. Pat. No. 7,470,459 B1; United States Patent Publications 2008/0251960 A1; 2008/0318016 A1; and WO 2009/056286 A1.

In one group of these patents, polyethylene filaments were subjected to a contact pressure at elevated temperature to selectively melt a portion of the fibers to bind the filaments together, followed by compression of the bound fibers. An UHMW PE SPECTRA® yarn subjected to this process in U.S. Pat. No. 5,628,946 lost 69% of its longitudinal modulus.

In another group of these patents, polyethylene powder was compressed at elevated temperature to bond the particles into a continuous sheet that was further compressed and stretched. U.S. Pat. No. 5,091,133 describes a fiber made by this latter process having a tensile strength of 3.4 GPa. Polyethylene tapes so produced are commercially available under the trademark TENSYLON®. The highest tenacity reported on the TENSYLON® web site is 19.5 g/d (tensile strength of 1.67 GPa).

Research publications describing preparation of polyethylene tapes and/or flattening of UHMW PE fibers include the following:

R. J. Van et al., "The Hot Compaction of SPECTRA Gel-Spun Polyethylene Fibre", *J. Matl. Sci.*, 32, 4821-4831 (1997)

A. Kaito et al., "Hot Rolling and Quench Rolling of Ultra-high Molecular Weight Polyethylene", *J. Appl. Poly Sci.*, 29, 1207-1220 (1983); "Preparation of High Modulus Polyethylene Sheet by the Roller-Drawing Method", *J. Appl. Poly Sci.*, 30, 1241-1255 (1985); "Roller Drawing of Ultrahigh Molecular Weight Polyethylene", *J. Appl. Poly. Sci.*, 30, 4591-4608 (1985)

The highest breaking strength reported in these publications was approximately 0.65 GPa corresponding to a tenacity of about 7.6 g/d. In the publication by Van et al. cited above, the longitudinal modulus of the UHMW PE was reduced by 27 to 74%.

Each of the patents and publications cited above represents improvement in the state of the art. However, none describes the specific process of this invention and none satisfies all of the needs met by this invention. There is a continuing need for materials that provide superior resistance to penetration by ballistic projectiles.

As noted above, the SEA of a fibrous construction is known to generally increase with increasing strength, tensile modulus and energy-to-break of the constituent fibers. Highly oriented UHMW PE multi-filament yarns having strengths much greater than those of the tape articles of the prior art are commercially available. Conversion of such high strength yarns into tape articles with substantial retention of strength could be helpful. It could also be helpful to provide woven and non-woven fabrics and ballistic and penetration resistant articles comprising said tape articles.

SUMMARY OF THE INVENTION

For the purposes of the invention, a polyethylene tape article is defined as a polyethylene article having a length greater than its width, less than about 0.5 millimeter thickness, and having a average cross-sectional aspect ratio greater than about 10:1.

In one embodiment, the invention is a process for the production of a polyethylene tape article of indefinite length comprising:

a) selecting at least one polyethylene multi-filament yarn, said yarn having a c-axis orientation function at least 0.96, an intrinsic viscosity when measured in decalin at 135° C. by ASTM D1601-99 of from about 7 dl/g to 40 dl/g, and said yarn having a tenacity of from about 15 g/d to about 100 g/d as measured by ASTM D2256-02 at a 10 inch (25.4 cm) gauge length and at an extension rate of 100%/min;

b) placing said yarn under a longitudinal tensile force and subjecting said yarn to at least one transverse compression step to flatten, consolidate and compress said yarn at a temperature of from about 25° C. to about 137° C., thereby forming a tape article having a average cross-sectional aspect ratio at least about 10:1, each said compression step having an outset and a conclusion wherein the magnitude of said longitudinal tensile force on each said yarn or tape article at the outset of each said compression step is substantially equal to the magnitude of the longitudinal tensile force on the yarn or tape article at the conclusion of that same compression step, and is at least about 0.25 kilogram-force (2.45 Newtons).

c) stretching said tape article at least once at a temperature in the range of from about 130° C. to about 160° C. at a stretch rate of from about 0.001 min$^{-1}$ to about 1 min$^{-1}$;

d) optionally repeating step b) one or more times at a temperature from about 100° C. to about 160° C.;

e) optionally repeating step c) one or more times;

f) optionally relaxing the longitudinal tensile force between any of steps b) to e);

g) optionally increasing the longitudinal tensile force between any of steps b) to e)

h) cooling said tape article to a temperature less than about 70° C. under tension.

In a second embodiment, the invention is a process for the production of a polyethylene tape article of indefinite length comprising:

a) selecting at least one polyethylene multi-filament yarn, said yarn having a c-axis orientation function at least 0.96, an intrinsic viscosity when measured in decalin at 135° C. by ASTM D1601-99 of from about 7 dl/g to 40 dl/g, said yarn having a tenacity of from about 15 g/d to about 100 g/d as measured by ASTM D2256-02 at a 10 inch (25.4 cm) gauge length and at an extension rate of 100%/min;

b) passing said yarn through one or more heated zones at temperatures of from about 100° C. to about 160° C. under tension;

c) stretching said heated yarn at least once at a stretch rate of from about 0.01 min$^{-1}$ to about 5 min$^{-1}$.

d) placing said yarn under a longitudinal tensile force and subjecting said yarn to at least one transverse compression step to flatten, consolidate and compress said yarn at a temperature of from about 100° C. to about 160° C., thereby forming a tape article having a average cross-sectional aspect ratio at least about 10:1, each said compression step having an outset and a conclusion wherein the magnitude of said longitudinal tensile force on each said yarn or tape article at the outset of each said compression step is substantially equal to the magnitude of the longitudinal tensile force on the yarn or tape article at the conclusion of that same compression step, and is at least about 0.25 kilogram-force (2.45 Newtons).

e) stretching said tape article at least once at a temperature of from about 130° C. to about 160° C. at a stretch rate of from about 0.001 min$^{-1}$ to about 1 min$^{-1}$;

f) optionally repeating step d) one or more times;

g) optionally repeating step e) one or more times;

h) optionally relaxing the longitudinal tensile force between any of steps c) to g)

i) optionally increasing the longitudinal tensile force between any of steps c) to g)

j) cooling said tape article to a temperature less than about 70° C.;

In a third embodiment, the invention is a polyethylene tape article of indefinite length and an average cross-sectional aspect ratio at least 10:1, said polyethylene having an intrinsic viscosity when measured in decalin at 135° C. by ASTM D1601-99 of from about 7 dl/g to about 40 dl/g, and when measured by ASTM D882 at a 10 inch (25.4 cm) gauge length and at an extension rate of 100%/min, said tape article having a tensile strength at least about 3.6 GPa.

In a fourth embodiment, the invention is a fabric comprising tape articles of the invention, said fabric being selected from the group consisting of woven, knitted and three dimensionally woven.

In a fifth embodiment, the invention is a laminate comprising two or more unidirectional layers of the tape articles of the invention with the tape direction in adjoining layers being rotated from each other by from about 15 to about 90 degrees.

In a sixth embodiment, the invention is an impact and penetration resistant composite comprising at least one member selected from the group consisting of a fabric of the invention, a laminate of the invention, and their combination.

BRIEF DESCRIPTION OF THE DRAWINGS

FIG. 7 illustrates a seventh apparatus for implementing a process of the invention.

Figure 1:
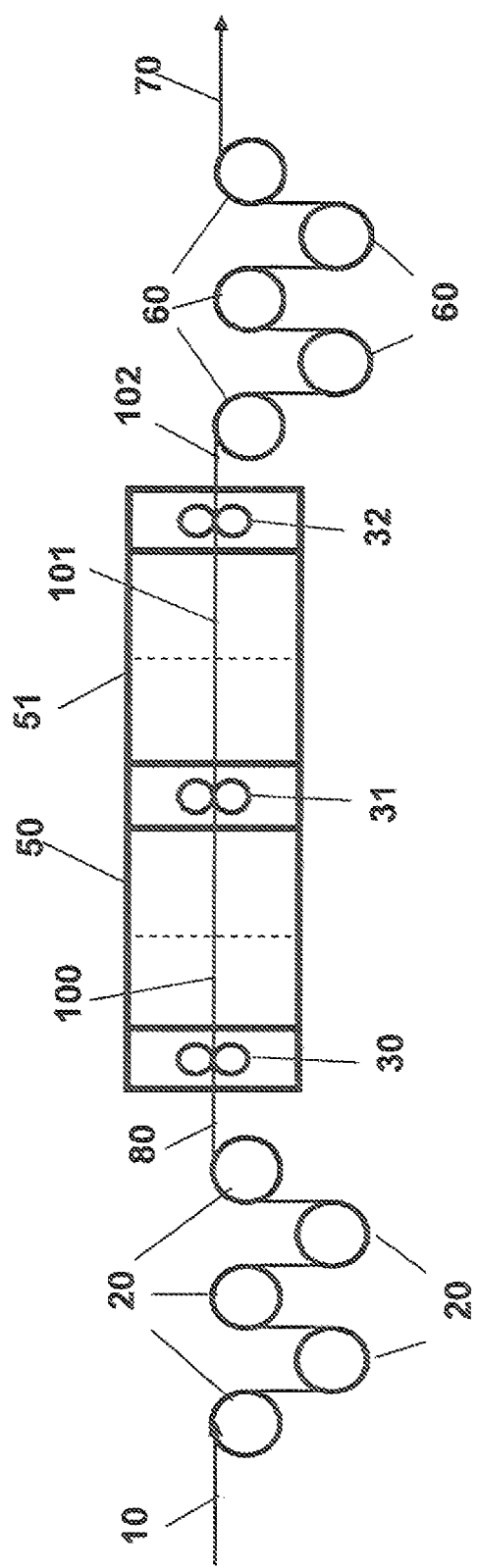
FIG. 1 illustrates a first apparatus for implementing a process of the invention.

In each figure only one yarn end is shown for clarity. It will be understood that several yarn ends may be simultaneously treated in parallel by a process of the invention to produce several parallel tape articles, or a single wide tape article.

DETAILED DESCRIPTION OF THE INVENTION

We provide a process for converting high strength UHMW PE yarns into tape articles with substantial retention of strength. The inventive method provides substantially equal longitudinal tensile forces across a compression step. It is believed the inventive method is superior to prior art methods that maintain equal tensile stress (g/d) across a compression step with consequent unbalanced tensile forces.

For the purposes of the invention, a polyethylene tape article is defined as a polyethylene article having a length greater than its width, less than about 0.5 millimeter thickness, and having a average cross-sectional aspect ratio greater than about 10:1. Preferably, a tape article of the invention has a width less than about 100 cm, more preferably less than about 50 cm, yet more preferably less than about 25 cm, and most preferably, less than about 15.2 cm.

Preferably a tape article of the invention has a thickness less than about 0.25 millimeter, more preferably, a thickness less than about 0.1 millimeter, and most preferably, a thickness less than 0.05 millimeter. Thickness is measured at the thickest region of the cross-section.

Average cross-sectional aspect ratio is the ratio of the greatest to the smallest dimension of cross-sections averaged over the length of the tape article. Preferably, a tape article of the invention has an average cross-sectional aspect ratio at least about 20:1, more preferably at least about 50:1, yet more preferably at least about 100:1, still more preferably at least about 250:1 and most preferably, at least about 400:1.

The cross-section of a tape article of the invention may be rectangular, oval, polygonal, irregular, or of any shape satisfying width, thickness and aspect ratio requirements. Preferably, a tape article of the invention has an essentially rectangular cross-section.

The UHMW PE yarn selected as a feed for a process of this invention may be prepared by any convenient method. Preferably, the selected UHMW PE yarn is prepared by "gel spinning". Gel spun UHMW PE yarns are commercially available from Honeywell International under the tradename SPECTRA®, from DSM N.V. and Toyobo Co. Ltd. Under the trade name DYNEEMA®, from Shanghai Pegaus Materials Co., Ltd., from Hangzhou High Strength Fiber Material Inc. and from others.

The UHMW PE yarn selected as a feed for a process of this invention has a intrinsic viscosity when measured in decalin at 135° C. by ASTM D1601-99 of from about 7 dl/g to about 40 dl/g, preferably from about 10 dl/g to about 40 dl/g, more preferably from about 12 dl/g to about 40 dl/g, and most preferably, from about 14 dl/g to 35 dl/g.

The UHMW PE yarn selected as a feed for a process of this invention is highly oriented. A highly oriented UHMW PE yarn in the context of the invention is defined as having a c-axis orientation function at least about 0.96, preferably at least about 0.97, more preferably at least about 0.98 and most preferably, at least about 0.99. The c-axis orientation function is a description of the degree of alignment of the molecular chain direction with the fiber direction and is calculated from the equation reported by R. S. Stein, *J. Poly Sci.,* 31, 327 (1958).

$$f_c = \frac{1}{2}(3\langle\cos\theta\rangle^2 - 1)$$

where θ is the angle between the c-axis of the polyethylene crystals (the molecular chain direction) and the fiber direction and the carets indicate the average of the quantity therebetween.

The average cosine of the angle between the "c" crystal axis and the fiber direction is measured by well known x-ray diffraction methods. A polyethylene fiber in which the molecular chain direction is perfectly aligned with the fiber axis would have a $f_c=1$.

The UHMW PE yarn selected as a feed for a process of this invention has a tenacity from about 15 g/d to about 100 g/d, preferably from about 25 g/d to about 100 g/d, more preferably from about 30 g/d to about 100 g/d, yet more preferably from about 35 g/d to about 100 g/d, still more preferably from about 40 g/d to about 100 g/d and most preferably, from about 45 g/d to about 100 g/d.

The UHMW PE yarn selected as a feed for a process of this invention may be untwisted or it may be twisted. Preferably the yarn has less than about 10 turns of twist per inch of length. The UHMW PE yarn selected as a feed may be heat set by a process described in U.S. Pat. No. 4,819,458 hereby incorporated by reference to the extent not incompatible herewith.

The UHMW PE yarn selected as a feed for a process of this invention may consist of unconnected filaments, or the filaments may be at least partially connected by fusion or by bonding. Fusion of UHMW PE yarn filaments may be accomplished by various means. Convenient means include the use of heat and tension, or through application of a solvent or plasticizing material prior to exposure to heat and tension as described in U.S. Pat. Nos. 5,540,990, 5,749214, 6,148,597 hereby incorporated by reference to the extent not incompatible herewith. Bonding may be accomplished by at least partially coating the filaments with a material having adhesive properties, such as KRATON® D1107.

In a first embodiment, the invention is a process for the production of a polyethylene tape article of indefinite length comprising:
 a) selecting at least one polyethylene multi-filament yarn, said yarn having a c-axis orientation function at least 0.96, an intrinsic viscosity when measured in decalin at 135° C. by ASTM D1601-99 of from about 7 dl/g to 40 dl/g, and said yarn having a tenacity of from about 15 g/d to about 100 g/d as measured by ASTM D2256-02 at a 10 inch (25.4 cm) gauge length and at an extension rate of 100%/min;
 b) placing said yarn under a longitudinal tensile force and subjecting said yarn to at least one transverse compression step to flatten, consolidate and compress said yarn at a temperature of from about 25° C. to about 137° C., thereby forming a tape article having a average cross-sectional aspect ratio at least about 10:1, each said compression step having an outset and a conclusion wherein the magnitude of said longitudinal tensile force on each said yarn or tape article at the outset of each said compression step is substantially equal to the magnitude of the longitudinal tensile force on the yarn or tape article at the conclusion of that same compression step, and is at least about 0.25 kilogram-force (2.45 Newtons).
 c) stretching said tape article in at least one stage at a temperature in the range of from about 130° C. to about 160° C. at a stretch rate of from about 0.001 min$^{-1}$ to about 1 min$^{-1}$;
 d) optionally repeating step b) one or more times at a temperature from about 100° C. to about 160° C.;
 e) optionally repeating step c) one or more times;
 f) optionally relaxing the longitudinal tensile force between any of steps b) to e);
 g) optionally increasing the longitudinal tensile force between any of steps b) to e);
 h) cooling said tape article to a temperature less than about 70° C. under tension.

Preferably, steps b) through h) are performed continuously.

In a second embodiment, the invention is a process for the continuous production of a polyethylene tape article of indefinite length comprising:
 a) selecting at least one polyethylene multi-filament yarn, said yarn having a c-axis orientation function at least 0.96, an intrinsic viscosity when measured in decalin at 135° C. by ASTM D1601-99 of from about 7 dl/g to 40 dl/g, said yarn having a tenacity of from about 15 g/d to about 100 g/d as measured by ASTM D2256-02 at a 10 inch (25.4 cm) gauge length and at an extension rate of 100%/min;
 b) passing said yarn continuously through one or more heated zones at temperatures of from about 100° C. to about 160° C. under tension;

c) stretching said heated yarn at least once at a stretch rate of from about 0.01 min$^{-1}$ to about 5 min$^{-1}$.
d) placing said yarn under a longitudinal tensile force and subjecting said yarn to at least one transverse compression step to flatten, consolidate and compress said yarn at a temperature of from about 100° C. to about 160° C., thereby forming a tape article having a average cross-sectional aspect ratio at least about 10:1, each said compression step having an outset and a conclusion wherein the magnitude of said longitudinal tensile force on each said yarn or tape article at the outset of each said compression step is substantially equal to the magnitude of the longitudinal tensile force on the yarn or tape article at the conclusion of that same compression step, and is at least about 0.25 kilogram-force (2.45 Newtons).
e) stretching said tape article at least once at a temperature of from about 130° C. to about 160° C. at a stretch rate of from about 0.001 min$^{-1}$ to about 1 min$^{-1}$;
f) optionally repeating step d) one or more times;
g) optionally repeating step e) one or more times;
h) optionally relaxing the longitudinal tensile force between any of steps c) to g);
i) optionally increasing the longitudinal tensile force between any of steps c) to g)
j) cooling said tape article to a temperature less than about 70° C. under tension;

Preferably, steps b) through j) are performed continuously.

Figure 2:
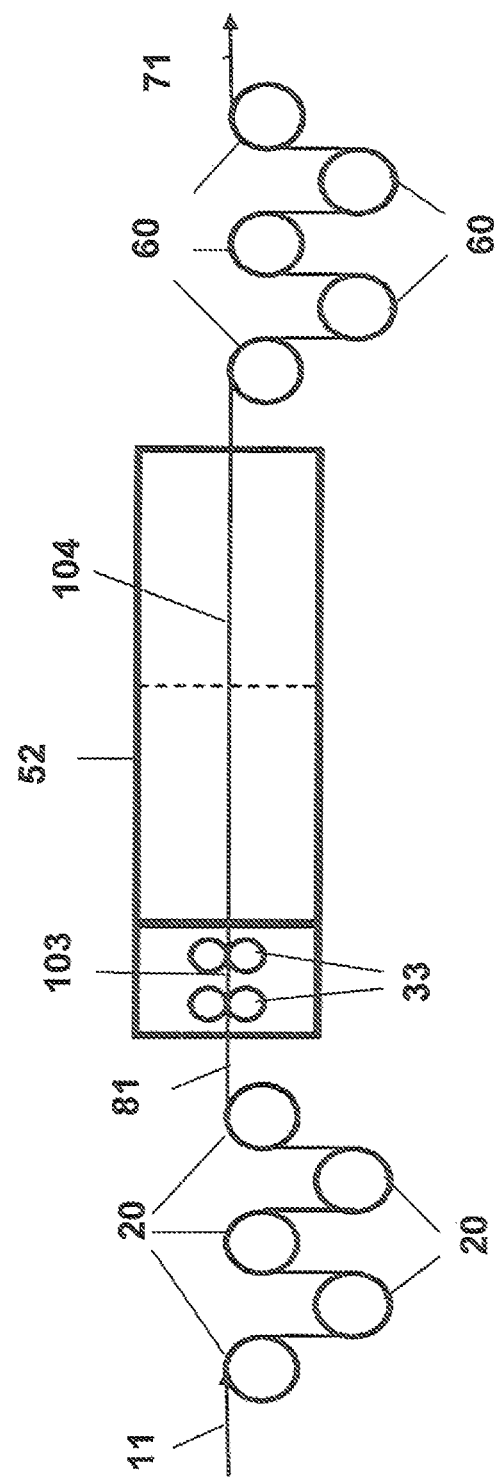
FIG. 2 illustrates a second apparatus for implementing a process of the invention.

A continuous process of the first embodiment is illustrated schematically in FIGS. 1, 2 and 7. A continuous process of the second embodiment is illustrated schematically in FIGS. 3-6. The figures illustrating a particular embodiment differ in the number and placement of process equipment, but illustrate the same steps.

In each of FIGS. 1 to 7 a selected multi-filament UHMW PE yarn (10-16 respectively) is unwound from a package or beam (not shown) and is passed over and under several restraining rolls (20). The restraining rolls are at temperature of from about 25° C. to about 137° C.

In FIGS. 1-2 and 7, the yarn leaving the restraining rolls (80, 81, 86 respectively) is passed under tension directly into one or more means (30, 33, 39) for compressing, consolidating, and flattening the yarn, thereby forming a tape article. The tape article is subsequently heated and stretched at least once.

In FIGS. 3 to 6 the yarn leaving the restraining rolls (82-85 respectively) is heated and stretched before reaching a means for compression. Heating of a yarn may be by any means, such as by infra-red radiation, contact with a heated surface, or contact with a heated fluid. Preferably, the yarn is heated and stretched in a forced convection air oven (50-59, 510 in FIGS. 1-7) having multiple temperature zones. The yarn is stretched at least once at temperatures of from about 100° C. to about 160° C. at a stretch rate of from about 0.01 min$^{-1}$ to about 5 min$^{-1}$. Stretch rate is defined as the difference between the speed at which a material leaves a stretch zone ($V_2$) and the speed at which it entered a stretch zone ($V_1$) divided by the length of the stretch zone (L), i.e., Stretch rate=$(V2-V1)/L$, min$^{-1}$ Preferably, the yarn is stretched to a stretch ratio of from about 1.01:1 to about 20:1 at a temperature of about 135° C. to about 155° C. Preferably, the stretch ratio is the maximum possible without rupturing the yarn.

In both of the above embodiments, each yarn or tape article is under a longitudinal tensile force at both the outset and conclusion of compression in each means for compression (30-40). Longitudinal tensile force is regulated by regulating the speeds of successive driven means.

The magnitude of the longitudinal tensile force on the yarn or tape article at the outset of each compression step is substantially equal to the magnitude of the longitudinal tensile force on the yarn or tape article at the conclusion of the same compression step. In the context of the invention, the term "substantially equal" means that the ratio of a lower to higher tensile force across a compression step is at least 0.75:1, preferably at least 0.80:1, more preferably at least 0.85:1, yet more preferably, at least 0.90:1, and most preferably, at least 0.95:1. Such substantially equal longitudinal tensile force at the outset and conclusion of a compression step is a fundamental feature of the inventive process. Equal tensile forces across a compression step assures zero tension at the midpoint of compression.

It is believed the inventive method is superior to prior art methods that maintain equal tensile stress (g/d) across a compression means with consequent unbalanced tensile forces as denier is reduced. The inventive method enables higher pressures and higher temperatures in a compression step without rupture of the yarn or tape article or slippage in a means for compression. It is believed that this enables higher productions speeds and ability to achieve superior strengths.

The longitudinal tensile force is at least 0.25 kilogram-force (abbreviated Kgf, equal to 2.45 Newtons, abbreviated N) on the yarn or tape article at the inlet and at the outlet of a compression step. Preferably, the tensile force is at least 0.5 Kgf (4.9 N), more preferably at least 1 Kgf (9.8 N), yet more preferably at least 2 Kgf (19.6.2 N), and most preferably, at least 4 Kgf (39.2 N) at the outset and conclusion of a compression step. Most preferably, longitudinal tensile force is as high as possible without rupturing the yarn or tape article and without causing slippage of the yarn or tape article in a compression means.

For the sake of definiteness without intending to limit the scope of the invention, the illustrated compression means (30-40) in each of FIGS. 1-7 are counter-rotating, opposed rolls (nip rolls): each nip roll of a unit preferably has the same surface speed, and presses upon the yarn or tape article. Other suitable and well known compression means include nip roll stacks consisting of three or more rolls in a single unit that provide two or more compressions, pairs of moving belts that press from opposite sides against the yarn or tape article, rolls where the yarn or tape article makes a 180° turn under high tension and the like. The pressure applied by nip rolls and moving belts may be actuated by hydraulic cylinders, or the pressure may result from fixing a gap between the rolls at a dimension smaller than the thickness of the incoming material. Still other compression means are possible and are contemplated.

The means for compression may be vibrated. Considering the tape article to be a quasi-two dimensional object with length and width but negligible thickness, the vibration may be in a direction normal to the plane of the tape article, or in the plane of the tape article or in a direction inclined to both planes. The vibration may be of low frequency, or of sonic or ultra-sonic frequencies. The vibration may be used as an aid in consolidation by imparting additional pulses of pressure or shear. It may also be used to produce periodic variations in thickness or width of the compressed article useful for bonding in composite applications.

The pressure exerted in a compression step in each embodiment is from about 20 to about 10,000 pounds per square inch (psi) (about 0.14 to about 69 MPa), preferably from about 50 to about 5000 psi (about 0.34 to about 34 MPa), and more preferably from about 50 to about 2500 psi (about 0.69 to about 17 MPa). The pressure is preferably increased at successive stages of compression. The compression means are at a temperature of from about 25° C. to about 160° C., preferably from about 50° C. to about 155° C., and more preferably from about 100° C. to about 150° C.

After passage through at least one compression means, e.g. (30) in FIG. 1, a now formed tape article (100) is heated and stretched at least once. Heating of the tape article may be by any means, such as by infra-red radiation, contact with a heated surface, or contact with a heated fluid. Preferably, the tape article is heated and stretched in a forced convection air oven (50, 51) having multiple temperature zones demarcated by the dashed lines in the figures. Not shown in the figures are heaters and blowers to heat and circulate the air through the oven.

Stretching of the tape article is at a temperature of from about 100° C. to about 160° C., and preferably from about 135° C. to about 150° C. The tape article is stretched at a stretch rate of from about 0.001 min$^{-1}$ about 1 min$^{-1}$. Preferably the tape article is stretched at a stretch rate of from about 0.001 min$^{-1}$ to about 0.1 min$^{-1}$. Preferably the tape article is stretched to a stretch ratio of from about 1.01:1 to 20:1.

Figure 3:
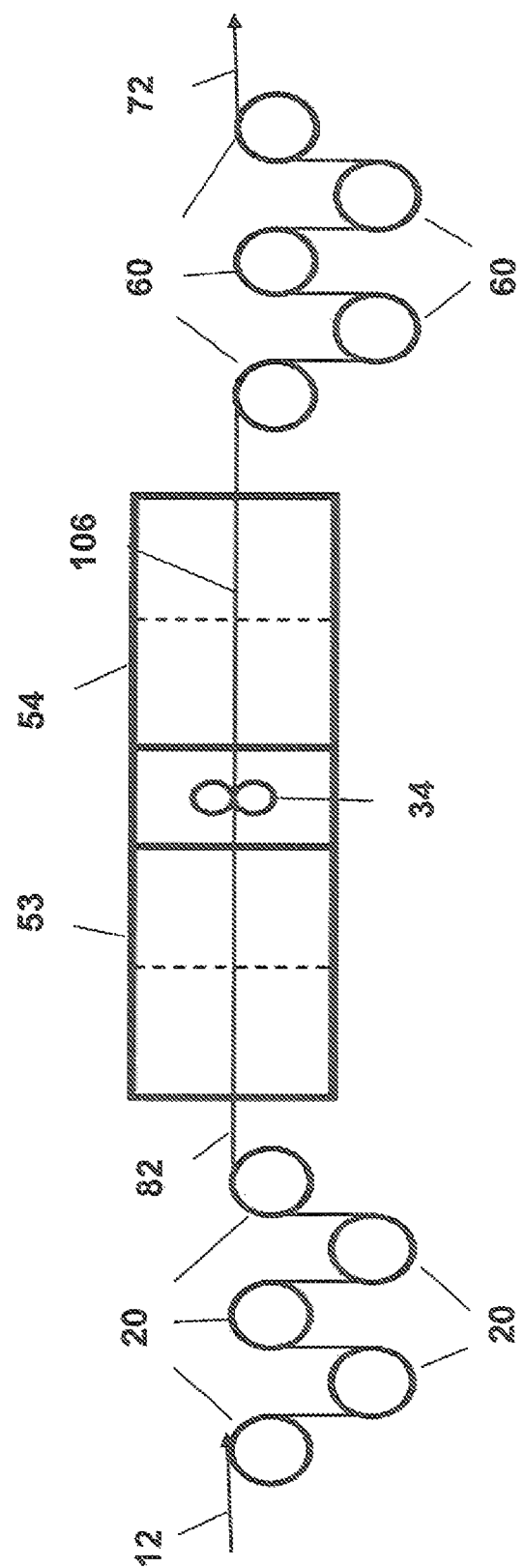
FIG. 3 illustrates a third apparatus for implementing a process of the invention.
Figure 4:
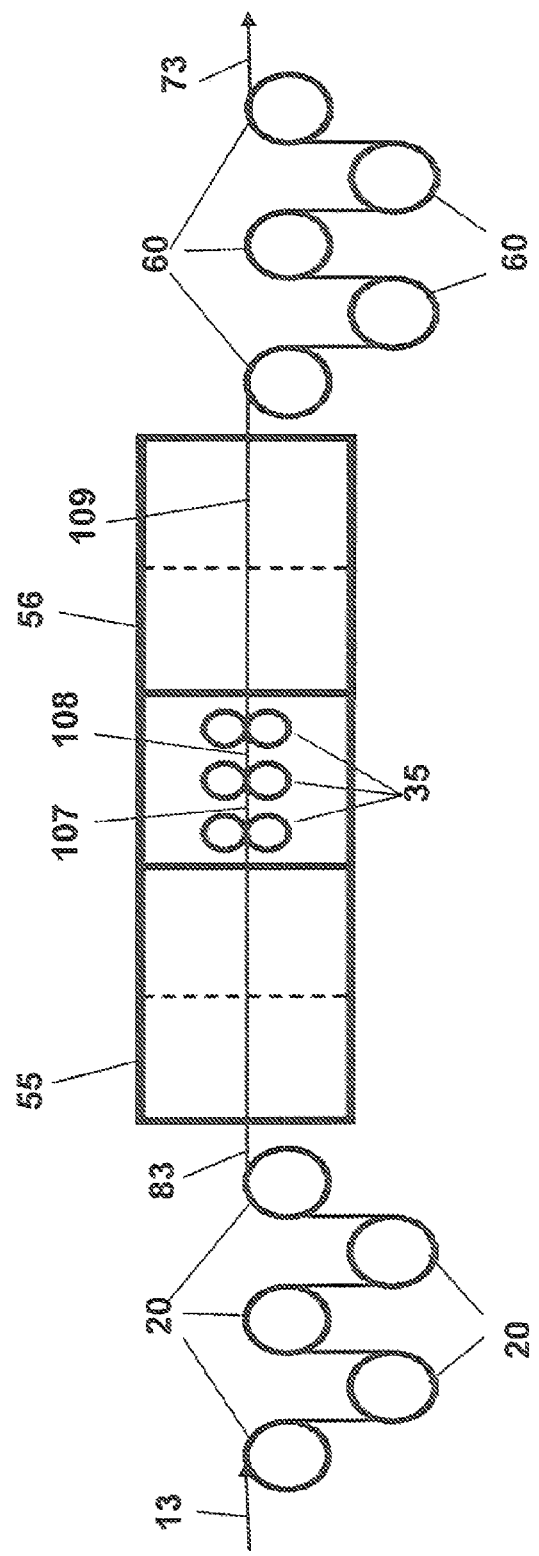
FIG. 4 illustrates a fourth apparatus for implementing a process of the invention.
Figure 5:
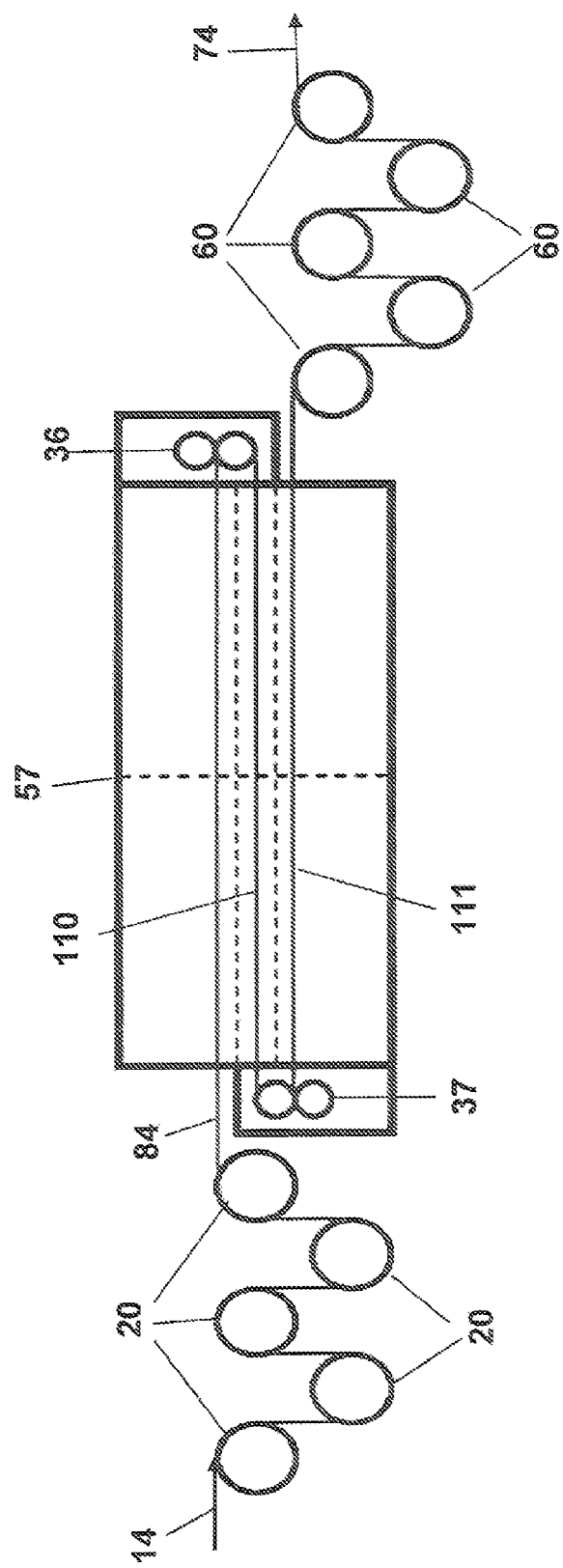
FIG. 5 illustrates a fifth apparatus for implementing a process of the invention.

The stretching force may be applied by any convenient means such as by passing the yarn over and under a sufficient number of driven rolls (60), as illustrated in FIGS. 2, 3, 4 and 6; by compression means (31, 32, 40) as illustrated in FIGS. 1 and 7; by both compression means (36, 37, 40) and driven rolls (60, 61) as in FIGS. 5 and 7; or by winding the tape article multiple times around a driven godet and idler roll pair (not illustrated). Driven rolls applying the stretching force may be internal to the oven or outside of the oven.

The longitudinal tensile force need not be the same throughout a continuous operation. Optionally, a yarn or tape article may be relaxed to lower longitudinal tensile force or permitted to shrink less than about 5% between successive compressions or stretches by tension isolation means. Alternatively, tension may be increased between successive compressions or stretches by tension isolation means. In FIG. 7, rolls (61) act as tension isolation means. The tensile force on tape article (114) can be either greater or less than on tape article (113), depending on the speed of nip rolls (39) and (40) and the temperatures in the two ovens. In either case, the speed of restraining rolls (20) and driven rolls (60) are adjusted to maintain the tensile force constant across the compression means (39 and 40).

The tape article is cooled under tension prior to being conveyed to a winder. The length of the tape article will diminish slightly caused by thermal contraction, but tension should be sufficiently high during cooling to prevent shrinkage beyond thermal contraction. Preferably, the tape article is cooled on rolls (60) and the rolls are cooled by natural convection, forced air, or are internally water-cooled. The final stretched tape article (70-76), cooled under tension to a temperature less than about 70° C., is wound up under tension (winder not shown) as a package or on a beam.

As noted above, the number and placement of compression and stretching means may be varied within a particular embodiment as is illustrated schematically in the Figures.

FIG. 1 illustrating the first embodiment shows a sequence of compression-stretching-compression-stretching-compression.

FIG. 2 illustrating the first embodiment shows a sequence of compression-compression-stretching.

FIGS. 3-6 illustrate the second embodiment of the invention. FIG. 3 shows a sequence of stretching-compression-stretching.

FIG. 4 shows a sequence of stretching-three consecutive compressions-stretching.

FIG. 5 shows a sequence of stretching-compression-stretching-compression-stretching in a six zone oven (57).

Figure 6:
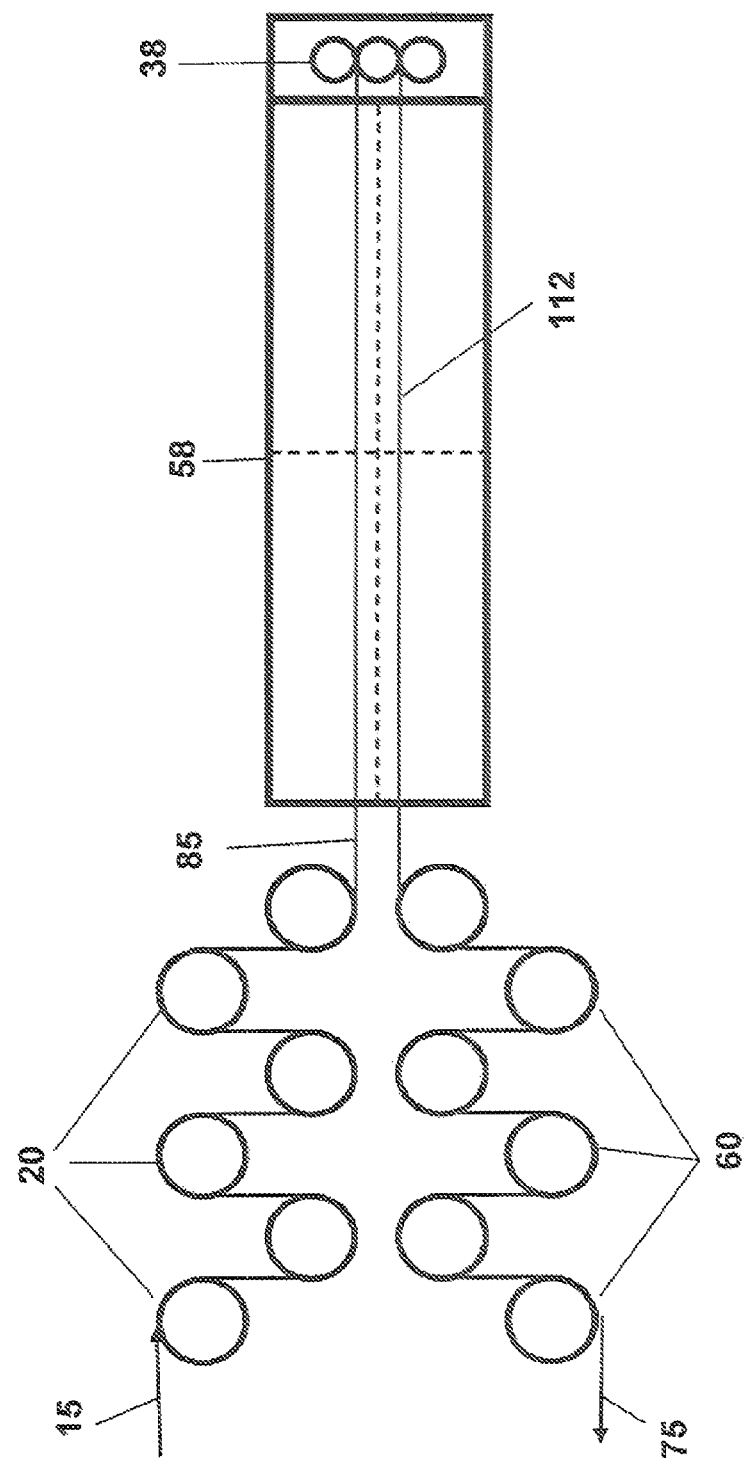
FIG. 6 illustrates a sixth apparatus for implementing a process of the invention.

FIG. 6 shows a sequence of stretching-two consecutive compressions-stretching in a four zone oven (58).

FIG. 7, illustrating the first embodiment, shows a sequence of compression-stretching-stretching at increased tensile force-compression.

Many other processing sequences consistent with one of either the first or second embodiments of the invention are possible, and are contemplated.

Preferably, a process of the invention produces a tape article having a tensile strength at least about 2.2 GPa, more preferably at least about 2.6 GPa, yet more preferably at least about 3.0 GPa, and most preferably, at least about 3.6 GPa.

Preferably, a process of the invention produces a tape article having a tensile strength at least 75% of the strength of the yarn from which it is made. More preferably, a process of the invention produces a tape having a higher tensile strength than the yarn from which it is made.

A third embodiment of the invention is a polyethylene tape article of indefinite length and an average cross-sectional aspect ratio at least 10:1, said polyethylene having an intrinsic viscosity when measured in decalin at 135° C. by ASTM D1601-99 of from about 7 dl/g to about 40 dl/g, and when measured by ASTM D882 at a 10 inch (25.4 cm) gauge length and at an extension rate of 100%/min, said tape article having a tensile strength at least about 3.6 GPa.

In a fourth embodiment, the invention is a fabric comprising tape articles of the invention, said fabric being selected from the group consisting of woven, knitted and three dimensionally woven. Preferably, a fabric of the invention is comprised of at least 50% by weight of tape articles of the invention.

In a fifth embodiment, the invention is a laminate comprising two or more unidirectional layers of the tape articles of the invention with the tape direction in adjoining layers being rotated from each other by from about 15 to about 90 degrees.

In a sixth embodiment, the invention is an impact and penetration resistant composite comprising at least one member selected from the group consisting of a fabric of the invention, a laminate of the invention, and their combination. Preferably, a composite of the invention is resistant to penetration by ballistic projectiles and by knives and other sharp or pointed implements.

The following examples are presented to provide a more complete understanding of the invention. The specific techniques, conditions, materials, proportions and reported data set forth to illustrate the principles of the invention are exemplary and should not be construed as limiting the scope of the invention.

Measurement Methods

Intrinsic Viscosity

Measurements of intrinsic viscosity were made by ASTM D1501-99 in decalin solution at 135° C.

Yarn Tenacity

Yarn tenacity was measured by ASTM D2256-02 at 10 inch (25.4 cm) gauge length and at an extension rate of 100% min.

Tape Tensile Strength

Tape tensile strength was measured by ASTM D882-09 at 10 inch (25.4 cm) gauge length and at an extension rate of 100%/min.

Orientation Function

C-axis orientation function ($f_c$) was measured by the wide angle x-ray diffraction method described in Correale, S. T. & Murthy, Journal of Applied Polymer Science, Vol. 101, 447-454 (2006) as applied to polyethylene,

EXAMPLES

Examples 1 to 2 were tests of simplified systems.

Example 1

Comparative

A 1200 denier multi-filament UHMW PE yarn having an intrinsic viscosity of 12 dl/g, a c-axis orientation function of 0.99, and a initial tenacity of 28 g/d was twisted 7 turns/inch (2.76 turns/cm). Tenacity of the twisted yarn was 15.5 g/d. The twisted yarn was drawn and fused and then statically compressed in a press between platens at a temperature of 22° C. and a pressure of about 8,000 psi (about 55 MPa). The tensile strength of the tape article was 2.0 GPa corresponding to a tenacity of 23.4 g/d. The tape article had retained 83.6% of the strength of the original untwisted yarn.

Example 2

Comparative

A 4800 denier multi-filament UHMW PE yarn having an intrinsic viscosity of 14 dl/g, a c-axis orientation function of 0.99, and a tenacity of 28 g/d was twisted about 0.025 turns per inch (about 0.01 turns/cm). The yarn was stretched at a ratio of 2.5:1 in a forced air convection oven at a temperature of 155.5° C. and at a stretch rate of 1.07 $min^{-1}$. The filaments of the yarn were thereby at least partially fused together. The tenacity of the stretched and fused yarn was 20 g/d.

The stretched and fused yarn having a diameter of about 0.065 cm was continuously pulled along a steel plate at a temperature of 152° C. and then through a fixed gap between the lower heated plate and an unheated upper steel plate. The upper plate was inclined at an angle to the lower plate such that its lower edge defined a line of contact with the yarn. The tensile force on the yarn was 225 g entering the gap and 400 g leaving the gap.

The yarn was continuous flattened, consolidated and compressed on passing through the gap under tension, thereby forming a tape. The tape remained in contact with the heated plate beyond the compression gap and some stretching may have occurred.

The tape article thereby produced had lateral dimensions of 0.005 inch (0.0127 cm) thickness by 0.10 inch (0.254 cm) width, and an aspect ratio of 20:1. The tape tensile strength was 1.62 GPa, corresponding to a tenacity of 19 g/d and 68% of the strength of the original yarn.

Example 3

The following example sets forth the best mode contemplated by the inventors of carrying out the first embodiment of the invention.

A 1200 denier gel spun multi-filament UHMW PE yarn twisted about 0.01 turns/cm is selected having an intrinsic viscosity of 14 dl/g, a c-axis orientation function of 0.99, and a tenacity of 47 g/d.

As illustrated in FIG. 1, the yarn (10) is unwound from a package on a creel (not shown) and is passed over restraining rolls (20). The rolls are at a temperature of 130° C. The yarn leaving the restraining rolls (80) is passed at a speed of 5 meters/min directly into a first pair of compression nip rolls (30). The nip rolls apply a longitudinal tensile force of 2.5 Kgf (24.5 N) to the yarn. The nip rolls are at a temperature of 135° C. The yarn is flattened, consolidated and compressed in the nip rolls under a pressure of about 500 psi (about 3.4 KPa) forming a tape article (100). The tape article leaving the first pair of nip rolls (30) is under a longitudinal tensile force of 2.5 Kgf (24.5 N) applied by a second pair of nip rolls (31).

The tape article (100) enters and traverses two zones of a forced air convection oven (50) in passing between nip rolls (30) and (31). The temperatures in the oven are: Zone 1-149° C., Zone 2-150° C. The tape article (100) is stretched at a stretch rate of 0.11 $min^{-1}$ in the oven (50). The stretched tape article is compressed a second time in nip rolls (31, and is passed into a second oven (51). The second nip roll temperatures are 147° C.

The twice-compressed and once-stretched tape article (101) is stretched at a stretch rate of 0.096 $min^{-1}$ in the first and second zones of the second oven (51) under the influence of a longitudinal tensile force of 2.5 Kgf (29.4 N) applied by a third pair of nip rolls (32). Zone temperatures in oven (51) are 151° C. and 152° C. respectively.

The tape article is then compressed a third time under a pressure of about 500 psi (about 3.4 KPa) at nip roll temperatures of 150° C. in the third set of nip rolls (32). The longitudinal tensile force in the tape article is essentially constant at 2.5 Kgf (29.4 N) at the inlet and at the outlet of the third set of nip rolls. The longitudinal tensile force in the tape article at the outlet of the third set of nip rolls (32) is applied by external rolls (60).

The tape is cooled under tension to a temperature of 50° C. on the external rolls (60). The final tape article (70) is wound up under tension at a speed of 7.5 meters/min.

The novel tape article produced has an essentially rectangular cross-section with a thickness of 0.00697 cm, a width of 0.135 cm and an average cross-sectional aspect ratio of 20:1. The tensile strength of the tape article is 3.6 GPa corresponding to a tenacity of 42 g/d. The tape article retains 89% of the strength of the yarn from which it is produced.

Example 4

The following example sets forth the best mode contemplated by the inventors of carrying out the second embodiment of the invention.

A 4800 denier gel spun multi-filament UHMW PE yarn twisted 0.01 turns/cm is selected having an intrinsic viscosity of 15 dl/g, a c-axis orientation function of 0.98, and a tenacity of 45 g/d.

As illustrated in FIG. 3 the yarn (12) is unwound from a package on a creel (not shown) and is passed continuously over restraining rolls (20). The rolls are at a temperature of 135° C. The yarn leaving the restraining rolls (82) is passed at a speed of 5 meters/min into a two zone oven (53) under a longitudinal tensile force of 8 Kgf (78.4 N). The longitudinal tension force is regulated by the speed of the nip rolls (34). The first and second oven zone temperatures are 149° C. and 150° C. respectively. The yarn is stretched at a stretch rate of 0.09 $min^{-1}$ in the oven (53) before entering the nip rolls. The stretched yarn is compressed in nip rolls (34) at a temperature of 152° C. forming a tape article. The tape article is passed into a second oven (54) and stretched under a longitudinal tensile force of 8 Kgf (78.4N). The longitudinal tensile force is regulated by the speed of the external rolls (60). The tape article is stretched at a stretch rate of 0.086 $min^{-1}$ at a temperature of 152° C.

The tape is cooled under tension to a temperature of 50° C. on the external rolls (60). The final tape article (72) is wound up under tension at a speed of 7 meters/min.

The novel tape article produced has an essentially rectangular cross-section with a thickness of 0.00627 cm, a width of 0.627 cm and an average cross-sectional aspect ratio of 100:1. The tensile strength of the tape article is 3.6 GPa corresponding to a tenacity of 42 g/d. The tape article retains 93% of the strength of the yarn from which it is produced.

Example 5

A tape article of the invention as described in Example 3 is woven into a plane weave fabric having a warp and fill count of 7.2 per centimeter.

Example 6

A tape article of the invention as described in Example 4 is woven into a plane weave fabric having a warp and fill count of 1.5 per centimeter.

Example 7

A tape article of the invention as described in Example 3 or in Example 4 is wound up in a multiplicity of packages and the packages are placed on a creel. Multiple ends of the tape articles, unwound from the creel, aligned parallel in lateral contact, are place on a carrier web consisting of a high density polyethylene (HDPE) film of 0.00035 cm thickness. The carrier web and tape articles are passed through heated nip rolls under pressure to adhere the tape articles to the carrier web. The carrier web and adhering parallel tape articles are wound up in two rolls.

The two rolls are fed into a cross-plying apparatus as described in U.S. Pat. No. 5,173,138 wherein the webs containing the tape articles are cross-plied and consolidated by means of heat and pressure. A four layer laminate is thereby formed where the layers, in sequential order through the laminate are HDPE-tape articles-tape articles-HDPE, and the direction of the tapes in adjacent layers are at right angles to one another. This laminate of the invention is rolled up.

Example 8

Fabrics of the invention as described in Example 5 or Example 6 are plied up and loosely connected to form an assembly of the invention having an areal density of 1.5 Kg/m². It is expected that the assembly of the invention has a specific energy absorption at least about 500 J-m2/Kg against a 9×19 mm FMJ Parabellum bullet as measured by MIL.-STD. 662F Example 9

Laminates of the invention as described in Example 7 are plied up and consolidated to form an impact and penetration resistant composite article of the invention having an areal density of 1.5 Kg/m². It is expected that the composite article of the invention has a specific energy absorption at least about 500 J-m2/Kg against a 9×19 mm FMJ Parabellum bullet as measured by MIL.-STD. 662F Having thus describe the invention in rather full detail, it will be understood that such detail need not be strictly adhered to but that further changes and modifications may suggest themselves to one skilled in the art, all falling within the scope of the invention as defined by the subjoined claims.

What is claimed is:

1. A laminate comprising two or more unidirectional layers of polyethylene tape articles, said polyethylene tape articles having an average cross-sectional aspect ratio of at least about 10:1, said polyethylene having an intrinsic viscosity when measured in decalin at 135° C. by ASTM D1601-99 of from about 7 dl/g to 40 dl/g, and when measured by ASTM D882-09 at a 10 inch (25.4 cm) gauge length and at an extension rate of 100%/min, said tape articles having a tensile strength of at least about 2.2 GPa, with the tape direction in adjoining layers being rotated from each other by from about 15 to about 90 degrees.

2. A fabric comprising polyethylene tape articles, said polyethylene tape articles having an average cross-sectional aspect ratio of at least about 10:1, said polyethylene having an intrinsic viscosity when measured in decalin at 135° C. by ASTM D1601-99 of from about 7 dl/g to 40 dl/g, and when measured by ASTM D882-09 at a 10 inch (25.4 cm) gauge length and at an extension rate of 100%/min, said tape articles having a tensile strength of at least about 2.2 GPa, said fabric being selected from the group consisting of woven, knitted and three dimensionally woven.

3. An impact and penetration resistant assembly comprising at least one member selected from the group consisting of a fabric as described in claim 2.

4. The assembly of claim 3 having an areal density at least 1.5 Kg/m² and a specific energy absorption of at least 500 J-m²/Kg at the V50 velocity as measured against a 9 by 19 mm FMJ Parabellum bullet by MIL.STD.662F.

* * * * *